(12) United States Patent
Watanabe et al.

(10) Patent No.: US 7,824,809 B2
(45) Date of Patent: Nov. 2, 2010

(54) ELECTROLYTE FOR NON-AQUEOUS CELL AND NON-AQUEOUS SECONDARY CELL

(75) Inventors: Shoichiro Watanabe, Osaka (JP); Shusaku Goto, Osaka (JP); Masaru Takagi, Osaka (JP); Sumihito Ishida, Osaka (JP); Toshikazu Hamamoto, Yamaguchi (JP); Akira Ueki, Yamaguchi (JP); Koji Abe, Yamaguchi (JP)

(73) Assignees: Panasonic Corporation, Osaka (JP); Ube Industries, Ltd., Yamaguchi (JP)

( * ) Notice: Subject to any disclaimer, the term of this patent is extended or adjusted under 35 U.S.C. 154(b) by 0 days.

(21) Appl. No.: 12/630,685

(22) Filed: Dec. 3, 2009

(65) Prior Publication Data
US 2010/0119953 A1    May 13, 2010

Related U.S. Application Data

(62) Division of application No. 10/333,617, filed on Jan. 22, 2003, now abandoned.

(51) Int. Cl.
*H01M 6/16*      (2006.01)
*H01M 4/583*    (2006.01)
*H01M 4/40*      (2006.01)
*H01M 10/0561* (2006.01)

(52) U.S. Cl. .................. 429/326; 429/332; 429/231.95; 429/61

(58) Field of Classification Search ........................ None
See application file for complete search history.

(56) References Cited

U.S. PATENT DOCUMENTS

| | | | |
|---|---|---|---|
| 4,489,145 A | 12/1984 | Abraham | |
| 4,888,255 A | 12/1989 | Yoshimitsu | |
| 4,943,497 A | 7/1990 | Oishi et al. | |
| 5,451,477 A | 9/1995 | Omaru | |
| 5,879,834 A | 3/1999 | Mao | |
| 6,033,797 A * | 3/2000 | Mao et al. | ...... 429/61 |
| 6,074,776 A | 6/2000 | Mao | |
| 2002/0192565 A1 | 12/2002 | Ueda | |
| 2008/0014496 A1 | 1/2008 | Watanabe | |

FOREIGN PATENT DOCUMENTS

| | | |
|---|---|---|
| JP | 1206571 | 8/1989 |
| JP | 6338347 | 12/1994 |
| JP | 7302614 | 11/1995 |
| JP | 9-45369 | 2/1997 |
| JP | 9050822 | 2/1997 |
| JP | 9106835 | 4/1997 |

(Continued)

OTHER PUBLICATIONS

International Search Report dated Dec. 11, 2001.

(Continued)

*Primary Examiner*—Keith Walker
(74) *Attorney, Agent, or Firm*—Dickinson Wright PLLC

(57) ABSTRACT

In a rechargeable non-aqueous electrolyte secondary battery using positive electrodes, negative electrodes and a non-aqueous electrolytic solution, additives to the electrolytic solution are used in combination, preferably in combination of at least two compounds selected from o-terphenyl, triphenylene, cyclohexylbenzene and biphenyl, and thus there are provided batteries excellent in safety and storage characteristics.

11 Claims, 1 Drawing Sheet

FOREIGN PATENT DOCUMENTS

| | | |
|---|---|---|
| JP | 10050342 | 2/1998 |
| JP | 10321258 | 12/1998 |
| JP | 2939469 | 6/1999 |
| JP | 2000-058116 | 2/2000 |
| JP | 2000 58116 | 2/2000 |
| JP | 2000 58117 | 2/2000 |
| JP | 2000058116 A * | 2/2000 |
| JP | 11-184931 | 1/2001 |
| JP | 2001 126765 | 5/2001 |
| JP | 2001-126765 | 5/2001 |
| JP | 2001 210364 | 8/2001 |

OTHER PUBLICATIONS

European Search Report dated Jun. 8, 2007.
European Office Action dated Jul. 10, 2009.
L. Ouatani, et al., "Effect of Vinylene Carbonate Additive in Li-Ion Batteries: Comparison of $LiCoO_2/C$, $LiFePO_4/C$ and $LiCoO_2/Li_4Ti_5O_{12}$," Journal of The Electrochemical Society, 156 (6) A468-A477 (2009), Apr. 14, 2009, 10 pages total.

* cited by examiner us7824809b2

ELECTROLYTE FOR NON-AQUEOUS CELL AND NON-AQUEOUS SECONDARY CELL

This is a divisional application of application number 10/333,617 filed Jan. 22, 2003, which is a national phase under 35 USC 371 of PCT/JP2001/007434 filed Aug. 29, 2001, which is based on Japanese application number 2000-311626 filed Oct. 12, 2000, the entire contents of each of which are incorporated by reference herein.

TECHNICAL FIELD

The present invention relates to a non-aqueous electrolytic solution which can ensure safety of batteries at the time of overcharging with improving recovery characteristics of the batteries after storage at high temperatures, and to a non-aqueous type secondary battery using said electrolytic solution.

BACKGROUND ART

Recently, AV devices and electronic devices such as personal computers of portable or cordless type have been rapidly developed, and secondary batteries which are small in size, light in weight and high in energy density are earnestly demanded as electric sources for driving these devices. Among them, non-aqueous electrolytic solution secondary batteries using a negative electrode containing lithium as an active material are hopefully expected as batteries having high voltage and high energy density.

In the above batteries, lithium-containing metal oxides which show a voltage on the order of 4 V are used for positive electrode active materials, and materials capable of intercalation or deintercalation of lithium, such as carbonaceous materials, are used for negative electrodes.

One of the most important tasks in these non-aqueous electrolytic solution batteries is to ensure the safety.

Particularly, in lithium ion secondary batteries, when they are charged in excess of a given charging voltage due to, for example, troubles of charging control circuits, they are in overcharged state, and lithium ions in the positive electrode are excessively extracted and migrate to negative electrode to cause absorption of lithium in an amount larger than the prescribed design capacity in the negative electrode or to cause precipitation of lithium as metallic lithium on the surface of negative electrode. If the batteries in such a state are further forcedly charged, internal resistance of the batteries increases and generation of heat due to the Joule's heat becomes great to cause abnormal heat generation, and, in the worst case, to result in thermal runaway. By providing a current interrupting switch of temperature sensing type (for example, a positive temperature coefficient thermistor (PTC) or a temperature fuse) outside the batteries, the current is interrupted without fail, and safety can be ensured at the time of generation of abnormal heat. Furthermore, in order to solve the problem of overcharge, a means of interrupting the charging current upon sensing the change of internal pressure of batteries is generally employed as disclosed in U.S. Pat. No. 4,943,497.

However, in the case of using such a mechanical current interrupting mechanism, reduction of cost is difficult and, furthermore, with the batteries becoming smaller and thinner, it becomes structurally difficult to insert the mechanism in the batteries.

For solving the above problems, there is proposed a method of adding to the electrolytic solution an additive which causes a reversible redox reaction, thereby to self-consume the electric energy introduced into the batteries as a redox shuttle (for example, JP-A-1-206571, JP-A-6-338347, JP-A-7-302614, etc.).

However, in the method of using the redox shuttle, when the overcharging current becomes great, there are limits in charge transfer reaction rate and lithium ion transfer rate, and, thus, it cannot be said that the method provides a sufficient safety.

For solving the above problems, JP-9-50822, JP-A-10-50342, JP-9-106835, JP-10-321258, Japanese Patent No. 2939469, and JP-A-2000-58117 propose a means of adding to batteries an aromatic compound having a methoxy group and a halogen group, biphenyl or thiophene, or an aromatic ether compound, which polymerizes at the time of overcharging to result in rising of temperature and, thus, to ensure the safety.

DISCLOSURE OF INVENTION

In the case of the batteries in which a current interrupting switch of temperature sensing type (for example, a positive temperature coefficient thermistor (PTC) or a temperature fuse) is provided outside the batteries against abnormal heat generation, when an excessively large overcharging current (5-6 C) of more than 5-6 times the rated capacity passes, the device per se generates heat due to the current and resistance increases, thereby interrupting the current, and thus the safety can be ensured, but in the case of a current generally used for charging and discharging the batteries (less than 1-2 C at the maximum), the rising of temperature is insufficient and the resistance does not increase. When overcharging is carried out at such a current value, the safety cannot be sufficiently ensured. If the setting is made so that the resistance increases in the generally used current region, naturally the inherent performance of the batteries are damaged.

In the case of adding to the batteries the above-mentioned additives such as aromatic compound having a methoxy group and a halogen group, biphenyl or thiophene, and an aromatic ether compound, it has been confirmed that in the generally used current ranges, the additives polymerize on the electrodes in overcharged state, and the safety is improved.

However, it has been found that these additives must be added in an amount of not less than 1% by weight for ensuring the safety at the time of overcharging, but if the additives are added in a large amount, in an shelf life test, for example, an environment test (80° C.) which supposes the case of leaving them in a car in summer, these additives partially react to cover the active material, resulting in considerable deterioration of the battery characteristics.

The above phenomenon is considered to occur because oxidative polymerization potential of the additives lowers due to exposure of the battery to a high temperature environment, and, furthermore, the potential distribution in the charged electrode is not uniform and higher potential portions are partially present, and, as a result, the additives react even in the ordinary environment of potential at which battery is used.

The above problem of deterioration due to storage can be solved, for example, by using an additive high in oxidative polymerization starting potential (for example, cyclohexylbenzene), but in this case, since the reaction potential of the additive is rather high at the time of the overcharging, the safety of overcharging cannot sufficiently be ensured.

The present invention solves the above problems and to provide a battery excellent in high-temperature storage characteristics while ensuring the safety at overcharging.

In order to solve the above problems, according to the present invention, in a non-aqueous electrolytic solution in which an electrolyte is dissolved in a non-aqueous solvent, two or more organic compounds differing in oxidative polymerization reaction potential are added. Preferably, organic compounds of relatively low oxidation reaction potential are added in a very small amount, preferably not less than 0.01% by weight and less than 1.0% by weight based on the total amount of the electrolytic solution, thereby to control the recovery characteristics after storage and the safety during overcharging. Specifically, it is preferred to add at least two organic compounds selected from o-terphenyl, triphenylene, cyclohexylbenzene and biphenyl.

It is preferred that not less than 1.0% by weight and not more than 3.0% by weight of o-terphenyl and not Tess than 0.01% by weight and less than 1.0% by weight of triphenylene are contained in the non-aqueous solvent.

Furthermore, it is preferred that not less than 1.0% by weight and not more than 5.0% by weight of cyclohexylbenzene and not less than 0.01% by weight and less than 1.0% by weight of biphenyl are contained in the non-aqueous solvent.

Moreover, it is preferred that not less than 1.0% by weight and not more than 5.0% by weight of cyclohexylbenzene and not less than 0.01% by weight and less than 1.0% by weight of o-terphenyl are contained in the non-aqueous solvent.

Further, it is preferred that not less than 1.0% by weight and not more than 5.0% by weight of cyclohexylbenzene, not less than 0.01% by weight and less than 1.0% by weight of o-terphenyl and not less than 0.01% by weight and less than 1.0% by weight of biphenyl are contained in the non-aqueous solvent.

Furthermore, it is preferred that all of o-terphenyl, triphenylene, cyclohexylbenzene and biphenyl are contained in the non-aqueous solvent and the total amount of them is 0.4-5% by weight based on the non-aqueous solvent.

These organic compounds are particularly effective when the positive electrodes comprise a material containing a lithium-containing metal oxide and the negative electrodes comprise a material containing graphite, and the non-aqueous electrolytic solution exerts the higher effect when it is an electrolytic solution in which a lithium salt as a solute is dissolved in a non-aqueous solvent mainly composed of a cyclic carbonate and a chain carbonate.

The cyclic carbonate is preferably at least one compound selected from ethylene carbonate (EC), propylene carbonate (PC), butylene carbonate (BC) and vinylene carbonate (VC).

The chain carbonate is preferably at least one compound selected from dimethyl carbonate (DMC), diethyl carbonate (DEC), ethylmethyl carbonate (EMC), methylpropyl carbonate (MPC) and ethylpropyl carbonate (EPC).

BEST MODE FOR CARRYING OUT THE INVENTION

Figure 1:
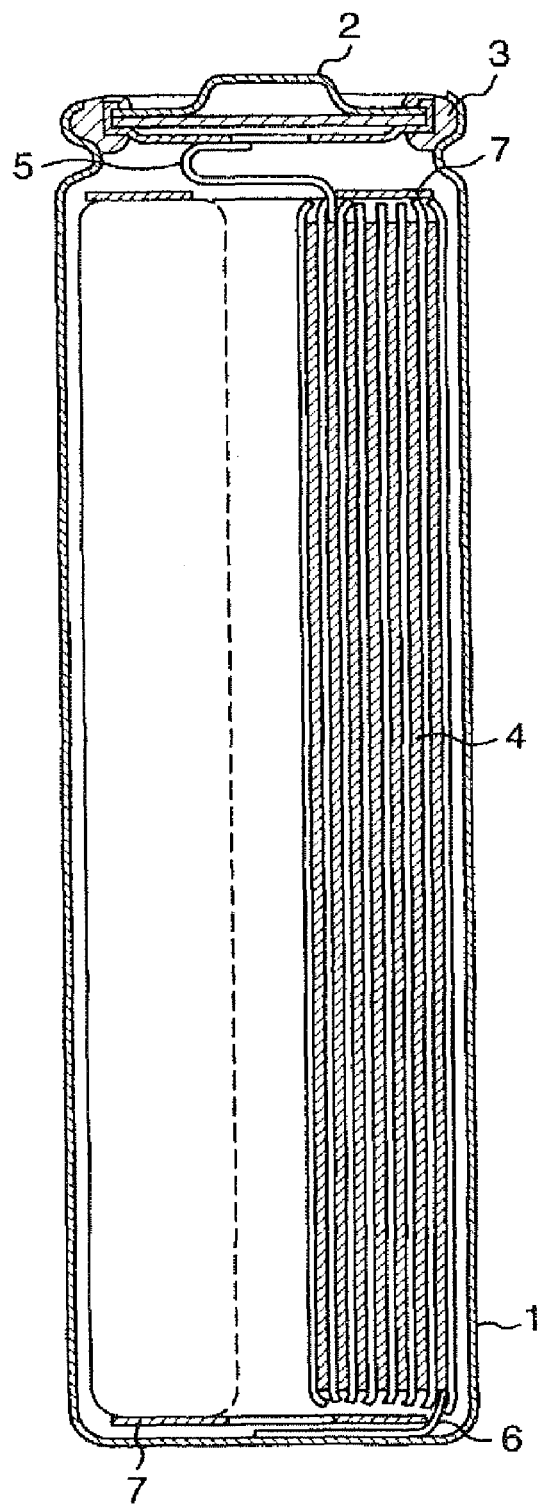
FIG. 1 is a longitudinal sectional view of a cylindrical battery in the examples of the present invention and in the comparative examples.

In the present invention, recovery characteristics after storage and safety during overcharging can be controlled by adding two or more organic compounds differing in oxidative polymerization reaction potential to the electrolytic solution.

Examples of organic compounds differing in oxidative polymerization potential contained in the electrolytic solution for non-aqueous type batteries in which an electrolyte is dissolved in a non-aqueous solvent are o-terphenyl, triphenylene, cyclohexylbenzene and biphenyl. As to the content of the organic compounds, the weight of the organic compound of relatively higher oxidative polymerization potential is preferably not less than 1.0% by weight and not more than 5.0% by weight based on the total amount of the non-aqueous electrolytic solution. The weight of the organic compound of relatively lower oxidative polymerization potential is preferably not less than 0.01% by weight and less than 1.0% by weight based on the total amount of the non-aqueous electrolytic solution. Furthermore, the weight ratio of the organic compound of relatively higher oxidative polymerization reaction potential and the organic compound of relatively lower oxidative polymerization reaction potential is preferably not lower than 20:1 and not higher than 2:1, more preferably not lower than 10:1 and not higher than 4:1.

In order to improve the recovery characteristics after storage, the amount of the organic compound of relatively lower oxidative polymerization starting potential (for example, biphenyl) is preferably smaller, but in order to ensure the safety at overcharging, the organic compound must react as much as possible at overcharging, namely, the amount is preferably rather larger.

According to the present invention, two or more organic compounds differing in oxidative polymerization reaction potential (hereinafter sometimes referred to as "additives") are used, and the amount of the organic compound of relatively lower oxidative polymerization starting potential (for example, biphenyl) is conspicuously reduced in this system, thereby maintaining excellent storage characteristics, and on the other hand the organic compounds react only slightly at the overcharging, whereby polarization at the overcharging increases, and the organic compound of relatively higher oxidative polymerization starting potential (for example, cyclohexylbenzene) react at an early stage, and thus the safety can be ensured. As a result, there can be attained both the recovery properties after storage and the insurance of safety at overcharging, which cannot be attained with addition of each organic compound singly.

Since the additives in the present invention do not aim at an action as redox shuttles, the oxidation reaction is desirably irreversible and they differ in purpose from JP-A-7-302614 and JP-A-9-50822 which aim at reversibility of redox reaction.

As the lithium-containing composite oxides used as positive electrode active materials in the present invention, mention may be made of, for example, $Li_xCoO_z$, $Li_xNiO_z$ (U.S. Pat. No. 4,302,518), $Li_xMnO_z$, $Li_xCo_yNi_{1-y}O_z$ (JP-A-63-299056), $Li_xCo_fV_{1-f}O_z$, $Li_xNi_{1-y}M_yO_z$ (M=Ti, V, Mn, Fe), $Li_xCo_aNi_bM_cO_z$ (M=Ti, Mn, Al, Mg, Fe, Zr), $Li_xMn_2O_4$, $Li_xMn_{2(1-y)}M_{2y}O_4$ (M=Na, Mg, Sc, Y, Fe, Co, Ni, Ti, Zr, Cu, Zn, Al, Pb, Sb) (x=0–1.2, y=0–1.0, f=0.9–0.98, z=1.9–2.3, a+b+c=1.0, $0 \leq a \leq 1$, $0 \leq b \leq 1$, $0 \leq c < 1$). The value x is a value before starting of charging and discharging, which increases or decreases by charging and discharging.

The lithium-containing composite oxides used as positive electrode active materials in the present invention can be prepared by mixing carbonate, nitrate, oxide or hydroxide of lithium with carbonate, nitrate, oxide or hydroxide of a transition metal such as cobalt, manganese or nickel at a desired composition, grinding the mixture and firing the powder or by a solution reaction. The firing method is especially preferred, and the firing temperature can be 250-1500° C. at which a part of the mixed compound is decomposed and molten. The firing time is preferably 1-80 hours. The firing gas atmosphere can be any of air atmosphere, oxidizing atmosphere or reducing atmosphere, and has no special limitation.

In the present invention, a plurality of different positive electrode active materials may be used in combination.

As current collectors of positive electrodes, there may be used any electron conductors as long as they do not undergo chemical changes in the constructed batteries. For examples, as materials of the current collectors, there may be used stainless steel, aluminum, titanium and carbon, and aluminum or aluminum alloys are especially preferred. As for the shape of the current collectors, they may be in the form of foil, film, sheet, net, punched material, lath, porous material, foamed material, fiber group, shaped nonwoven fabric, and the like. The surface of the current collectors may be made rough by a surface treatment. Thickness thereof is not particularly limited, and those of 1-500 μm are used.

The negative electrode materials used in the present invention may be lithium alloys, alloys, intermetallic compounds, carbons, organic compounds, inorganic compounds, metal complexes and organic high molecular compounds, which are capable of absorbing and releasing lithium ions. These may be used each alone or in combination.

As the carbonaceous materials, mention may be made of for example, cokes, pyrolytic carbons, natural graphite, artificial graphite, mesocarbon microbeads, graphitized mesophase spherules, vapor deposited carbons, glassy carbons, carbon fibers (polyacrylonitrile fibers, pitch fibers, cellulose fibers and vapor deposited carbon fibers), amorphous carbons, and carbons prepared by firing organic materials. These may be used each alone or in combination. Among them, preferred are graphite materials such as those obtained by graphitizing mesophase spherules, natural graphite and artificial graphite. These negative electrode materials may be used as composites, and, for example, combinations of carbon with alloys, carbon with inorganic compounds, and the like can be considered.

In the present invention, since Li is contained in the positive electrode active material, negative electrode materials which do not contain Li (such as carbon) can be used. Moreover, when Li is added to such negative electrode materials which do not contain Li in a small amount (about 0.01-10 parts by weight based on 100 parts by weight of the negative electrode materials), even if the materials become inactive owing to the reaction of a part of Li with electrolyte, Li can be supplemented with Li contained in the negative electrode materials, which is preferred. Li can be contained in the negative electrode materials, for example, in the following manner. That is, lithium metal which is molten by heating is coated on a current collector to which a negative electrode material is pressed, thereby impregnating the negative electrode material with Li, or lithium metal is previously applied to electrode group by press bonding and Li is electrochemically doped in the negative electrode material in the electrolytic solution.

As current collectors of negative electrodes, there may be used any electron conductors as long as they do not undergo chemical changes in the constructed batteries, For example, as materials of the collectors, there may be used stainless steel, nickel, copper, titanium, etc. Copper or copper alloys are especially preferred.

As for the shape of the current collectors, they may be in the form of foil, film, sheet, net, punched material, lath, porous material, foamed material, fiber group, shaped nonwoven fabric, and the like. Moreover, the surface of the current collectors may be made rough by a surface treatment. Thickness is not particularly limited, and those of 1-500 μm are used.

The non-aqueous electrolytic solution in the present invention comprises a solvent and a lithium salt dissolved in the solvent, As the non-aqueous solvents, mention may be made of cyclic carbonates such as ethylene carbonate (EC), propylene carbonate (PC), butylene carbonate (BC) and vinylene carbonate (VC), non-cyclic carbonates such as dimethyl carbonate (DMC), diethyl carbonate (DEC), ethylmethyl carbonate (EMC), ethylpropyl carbonate (EPC), methylpropyl carbonate (MPC), methylisopropyl carbonate (MIPC) and dipropyl carbonate (DPC), aliphatic carboxylic acid esters such as methyl formate, methyl acetate, methyl propionate and ethyl propionate, γ-lactones such as γ-butyrolactone, non-cyclic ethers such as 1,2-dimethoxyethane (DME), 1,2-diethoxyethane (DEE) and ethoxymethoxyethane (EME), cyclic ethers such as tetrahydrofuran and 2-methyltetrahydrofuran, dimethyl sulfoxide, 1,3-dioxolan, alkyl phosphate esters such as trimethyl phosphate, triethyl phosphate and trioctyl phosphate, and fluorides of them. These may be used each alone or in admixture of two or more. Among them, it is preferred to use a mixed system of a cyclic carbonate and a non-cyclic carbonate or a mixed system of a cyclic carbonate, non-cyclic carbonate and an aliphatic carboxylic acid ester as a main component.

The lithium salts which are dissolved in these solvents include, for example, $LiClO_4$, $LiBF_4$, $LiPF_6$, $LiAlCl_4$, $LiSbF_6$, LiSCN, LiCl, $LiCF_3SO_3$, $LiCF_3CO_2$, $LiAsF_6$, $LiN(CF_3SO_2)_2$, $Li_2B_{10}Cl_{10}$ (JP-A-57-74974), $LiN(C_2F_5SO_2)_2$, $LiPF_3(CF_3)_3$, $LiPF_3(C_2F_5)_3$, etc. These may be contained each alone or in combination of two or more in the electrolytic solution, etc. Among them, it is especially preferred that the solution contains $LiPF_6$.

Especially preferable non-aqueous electrolytic solution in the present invention is one which contains at least ethylene carbonate and ethylmethyl carbonate and $LiPF_6$ as a lithium salt. The amount of the electrolytic solution contained in the battery is not particularly limited, and it can be used in a necessary amount depending on the amount of positive electrode active material and that of negative electrode material and the size of the battery. The amount of the lithium salt dissolved in the non-aqueous solvent is not particularly limited, but is preferably 0.2-2 mol/l, especially preferably 0.5-1.5 mol/l.

The electrolytic solution is ordinarily used by impregnating or filling a separator such as of porous polymer or nonwoven fabric with the electrolytic solution.

Moreover, there may be used a gelled electrolyte comprising an organic solid electrolyte containing the non-aqueous electrolytic solution. As the organic solid electrolyte, polymeric matrix materials such as polyethylene oxide, polypropylene oxide, polyvinylidene fluoride and derivatives, mixtures and composites of these materials are effective. Especially preferred are copolymers of vinylidene fluoride and hexafluoropropylene and mixtures of polyvinylidene fluoride and polyethylene oxide.

As the separator, an insulating microporous thin film having a high ion permeability and a desired mechanical strength is used. The separator preferably has a function of closing the pores at a temperature of 80° C. or higher to enhance the resistance. Sheets or nonwoven fabrics made from olefin polymers comprising one or combination of polypropylene and polyethylene or glass fibers are used from the points of organic solvent resistance and hydrophobic properties. Pore diameter of the separator is preferably in such a range that active materials, binders and conducting agents which are released from the electrode sheets do not permeate through the pores, and, for example, the pore diameter is preferably 0.01-1 μm. The thickness of the separator is generally 5-300 μm. The porosity is determined depending on the permeability to electron or ion, kind of materials or film thickness, and is desirably 30-80%.

The shape of batteries can be any of sheet type, cylinder type, flat type, rectangular type, etc. When the shape of batteries is sheet type, cylinder type or rectangular type, the mix of positive electrode active material or negative electrode material is used mainly by coating on a current collector, then drying and compressing the collector.

The shape of the rolled electrodes in the present invention is not necessarily in the form of true cylinder, and may be in the form of ellipsoidal cylinder having a ellipsoidal section or in the form of square pillar such as rectangle.

Preferred combinations in the present invention are combinations of the preferred chemical materials and the preferred battery constituting parts mentioned above. Especially preferred are those which contain $Li_xCoO_2$, $Li_xNiO_2$, $Li_xMn_2O_4$ ($0 \leq x \leq 1$) as positive electrode active materials, and acetylene black as a conducting agent. The current collector of positive electrode is made of stainless steel or aluminum, and is in the form of net, sheet, foil or lath. The negative electrode material preferably contains at least one compound such as alloy and carbonaceous material. The current collector of negative electrode is made of stainless steel or copper and is in the form of net, sheet, foil or lath. Carbon materials such as acetylene black and graphite as the electron conducting agent may be contained in the mix used together with positive electrode active materials or negative electrode materials. As the binders, there may be used fluorine-containing thermoplastic compounds such as polyvinylidene fluoride and polytetrafluoroethylene, polymers containing acrylic acid, and elastomers such as styrene-butadiene rubber and ethylene-propylene terpolymer each alone or in admixture. The electrolytic solution preferably contains cyclic or non-cyclic carbonates such as ethylene carbonate, diethyl carbonate, dimethyl carbonate and ethylmethyl carbonate or additionally aliphatic carboxylic acid esters such as methyl acetate and methyl propionate, and $LiPF_6$ as a lithium salt. The separator preferably comprises polypropylene or polyethylene each alone or in combination. The battery may have any shapes such as cylindrical shape, flat shape, and rectangular shape. The battery preferably has a means for ensuring safety against errors in working (e.g., an internal pressure releasing type safety valve, a separator which enhances resistance at high temperatures).

EXAMPLES

Examples of the present invention will be explained below referring to the drawing.

Example 1

FIG. 1 is a longitudinal sectional view of the cylindrical battery used in this example. In FIG. 1, the reference numeral 1 indicates a battery case made by working a stainless steel plate having resistance to organic electrolytic solution, 2 indicates a sealing plate provided with a safety valve, 3 indicates an insulation packing, 4 indicates an electrode plate group, and positive electrode and negative electrode with separator interposed between the positive electrode and the negative electrode are rolled a plurality of times into a spiral form and inserted in the case 1. A positive electrode lead 5 is drawn from the positive electrode and connected to the sealing plate 2, and a negative electrode lead 6 is drawn from the negative electrode and connected to the bottom of the battery case 1. The reference numeral 7 indicates an insulation ring, which is provided at the upper and lower portions of the electrode plate group 4. The positive electrode, the negative electrode, and others will be explained in detail below.

The positive electrode was made in the following manner. $Li_2CO_3$ and $Co_3O_4$ were mixed and fired at 900° C. for 10 hours to prepare an $LiCoO_2$ powder. This powder was mixed with 3% of acetylene black and 7% of a fluorocarbon polymer binder based on the weight of the $LiCoO_2$ powder, followed by suspending the mixture in an aqueous carboxymethyl cellulose solution to prepare a positive electrode mix paste. The resulting positive electrode mix paste was coated on the surface of an aluminum foil of 20 μm in thickness which was a positive electrode current collector, and the coat was dried, followed by rolling to make a positive electrode plate of 0.18 mm in thickness, 37 mm in width and 390 mm in length.

For the negative electrode, a mesophase spherule which was graphitized at a high temperature of 2800° C. (hereinafter referred to as "mesophase graphite") was used. This mesophase graphite was mixed with 3% of a styrene-butadiene rubber based on the weight of the mesophase graphite, and then the mixture was suspended in an aqueous carboxymethyl cellulose solution to prepare a paste. This negative electrode mix paste was coated on both sides of a Cu foil of 0.02 mm in thickness and dried, followed by rolling to make a negative electrode plate of 0.20 mm in thickness, 39 mm in width and 420 mm in length.

A lead made of aluminum was attached to the positive electrode plate and a lead made of nickel was attached to the negative electrode plate, and the positive electrode plate and the negative electrode plate with a polyethylene separator of 0.018 mm in thickness, 45 mm in width and 840 mm in length interposed between the positive electrode plate and the negative electrode plate were rolled into a spiral form and inserted in a battery case of 17.0 mm in diameter and 50.0 mm in height. The electrolytic solution used was prepared by dissolving 1 mol/liter of $LiPF_6$ in a mixed solvent comprising EC and EMC at a volume ratio of 30:70, and as additives, 2% by weight of o-terphenyl and 0.2% by weight of triphenylene based on the total amount of the electrolytic solution were added to the electrolytic solution. The electrolytic solution was poured into the battery case, and then the case was sealed to make a battery 1 (battery capacity: 800 mAh) of the present invention.

Example 2

A cylindrical battery of spiral type was made in the same manner as in Example 1, except that cyclohexylbenzene in an amount of 2% by weight and biphenyl in an amount of 0.2% by weight based on the total amount of the electrolytic solution were used as the additives to the electrolytic solution. The thus obtained battery was referred to as battery 2 of the present invention.

Example 3

A cylindrical battery of spiral type was made in the same manner as in Example 1, except that cyclohexylbenzene in an amount of 2% by weight and o-terphenyl in an amount of 0.2% by weight based on the total amount of the electrolytic solution were used as the additives to the electrolytic solution. The thus obtained battery was referred to as battery 3 of the present invention.

Example 4

A cylindrical battery of spiral type was made in the same manner as in Example 1, except that cyclohexylbenzene in an amount of 2% by weight, biphenyl in an amount of 0.2% by weight and o-terphenyl in an amount of 0.2% by weight based on the total amount of the electrolytic solution were used as the additives to the electrolytic solution. The thus obtained battery was referred to as battery 4 of the present invention.

Example 5

A cylindrical battery of spiral type was made in the same manner as in Example 1, except that cyclohexylbenzene in an amount of 2% by weight, biphenyl in an amount of 0.2% by weight, o-terphenyl in an amount of 0.2% by weight and triphenylene in an amount of 0.1% by weight based on the total amount of the electrolytic solution were used as the additives to the electrolytic solution. The thus obtained battery was referred to as battery 5 of the present invention.

Comparative Example 1

A cylindrical battery was made in the same manner as in Example 1, except that the additives to the electrolytic solution were not used. The thus obtained battery was referred to as a comparative battery (battery 6).

Comparative Example 2

A cylindrical battery of spiral type was made in the same manner as in Example 1, except that biphenyl was used in an amount of 2.0% by weight based on the total amount of the electrolytic solution as the additive to the electrolytic solution. The thus obtained battery was referred to as a comparative battery (battery 7).

Comparative Example 3

A cylindrical battery of spiral type was made in the same manner as in Example 1, except that cyclohexylbenzene was used in an amount of 2.0% by weight based on the total amount of the electrolytic solution as the additive to the electrolytic solution. The thus obtained battery was referred to as a comparative battery (battery 8).

Comparative Example 4

A cylindrical battery of spiral type was made in the same manner as in Example 1, except that o-terphenyl was used in an amount of 2.0% by weight based on the total amount of the electrolytic solution as the additive to the electrolytic solution. The thus obtained battery was referred to as a comparative battery (battery 9).

Comparative Example 5

A cylindrical battery of spiral type was made in the same manner as in Example 1, except that biphenyl was used in an amount of 0.2% by weight based on the total amount of the electrolytic solution as the additive to the electrolytic solution. The thus obtained battery was referred to as a comparative battery (battery 10).

Then, as overcharging tests, 20 cells each of the batteries 1-5 of the present invention and the comparative batteries 6-9 were subjected to overcharging at 0.8 A (1 C) from charged state at an environmental temperature of 20° C., and it was examined whether abnormal heat generation occurred or not in the batteries. The number of cells among 20 cells in which abnormal heat generation occurred is shown in Tables 1 and 2.

Furthermore, as high-temperature storage tests, the batteries in charged state were left to stand at 80° C. for 4 days, and the discharge capacity at 1 C was compared with the discharge capacity before storing, and capacity recovery rate after storing was calculated. (Capacity recovery rate after storing=(1 C discharge capacity after storing)/(1 C discharge capacity before storing)×100(%)).

TABLE 1

(Example)

| No. | Additives | Occurrence of abnormal heat generation | Recovery rate after storage (%) |
|---|---|---|---|
| 1 | o-Terphenyl (2%) + triphenylene (0.2%) | 0/20 | 75 |
| 2 | Cyclohexylbenzene (2%) + biphenyl (0.2%) | 0/20 | 85 |
| 3 | Cyclohexylbenzene (2%) + o-terphenyl (0.2%) | 2/20 | 82 |
| 4 | Cyclohexylbenzene (2%) + biphenyl (0.2%) + o-terphenyl (0.2%) | 0/20 | 84 |
| 5 | Cyclohexylbenzene (2%) + biphenyl (0.2%) + o-terphenyl (0.2%) + triphenylene (0.1%) | 0/20 | 83 |

TABLE 2

(Comparative Example)

| No. | Additives | Occurrence of abnormal heat generation | Recovery rate after storage (%) |
|---|---|---|---|
| 6 | No | 20/20 | 87 |
| 7 | Biphenyl (2%) | 0/20 | 17 |
| 8 | Cyclohexylbenzene (2%) | 13/20 | 85 |
| 9 | o-Terphenyl (2%) | 7/20 | 69 |
| 10 | Biphenyl (0.2) | 14/20 | 82 |

As shown in Table 2, in the battery 6 having no additives, the phenomenon of abnormal heat generation occurred in all of 20 cells when they were subjected to overcharging. Hitherto, the safety of batteries has been ensured by providing a plurality of safety mechanisms comprising a protective circuit for charging voltage and a current interrupting mechanism, but the abnormal heat generation may occur in case no safety protection was provided as in the Comparative Example 1.

It can be seen that in the battery 7 of Comparative Example 2 in which biphenyl was added as the additive, abnormal heat generation did not occur even when it was subjected to overcharging, and safety could be ensured, but the recovery rate after storing at high temperatures was very low, namely, 17%.

This battery was disassembled after storing and analyzed to find a film which was considered to be a polymerization product was formed on the surface of the positive electrode, and it was presumed that the recovery rate decreased due to the hindrance to charging and discharging reaction of lithium ion.

Furthermore, in the battery 8 of Comparative Example 3 in which only cyclohexylbenzene high in reaction starting potential was contained, the recovery rate after storing at high temperatures was high, namely, 85%, and this battery showed characteristics substantially equal to those of the battery 6 containing no additives, but was insufficient in safety at the time of overcharging and more than half of the cells resulted in abnormal heat generation.

In the case of addition of o-terphenyl which was relatively high in reaction starting potential, ignition rate at overcharging somewhat decreased, but the decrease was still insufficient and, further, the recovery rate after storing was also insufficient.

When the amount of biphenyl of low reaction starting potential was reduced, the recovery rate after storing increased, but safety at overcharging could not be ensured as in the battery 10 of Comparative Example 5.

As explained above, it is not easy to ensure both the safety at overcharging and the high-temperature storage characteristics by using a single additive.

In comparison with the batteries of the comparative examples, in the batteries such as batteries 1-5 of the present invention in which two or more additives were contained, by adding a small amount of an additive of relatively lower reaction starting potential (biphenyl, o-terphenyl, triphenylene) in each system, the recovery rate after storing was improved and a recovery rate of more than 70% was maintained, and, moreover, since the additive of lower reaction starting potential which slightly reacted during the overcharging increased the polarization at overcharging, the additive of higher reaction starting potential started the reaction at the early stage to enhance the safety at overcharging. Thus, batteries superior in recovery characteristics in storing and high in safety at overcharging could be realized.

From the point of maintaining the safety at overcharging, the amount of cyclohexylbenzene is preferably not less than 1.0% by weight and not more than 5.0% by weight.

Furthermore, from the point of maintaining the recovery characteristics in storing, the amount of biphenyl or triphenylene is preferably not less than 0.01% by weight and less than 1.0% by weight.

INDUSTRIAL APPLICABILITY

As explained above, the present invention can provide batteries having high safety against overcharging and excellent in recovery characteristics in storing at high temperatures by combining additives to electrolytic solutions.

Portable telephones, portable information terminal devices, cam coders, personal computers, PDA, portable audio devices, electric cars, electric sources for road leveling, and the like which are high in safety can be provided by using the non-aqueous type electrolyte secondary batteries as mentioned above.

The invention claimed is:

1. An electrolytic solution for non-aqueous type batteries having a positive electrode comprising a material containing a lithium-containing metal oxide as a positive electrode active material and a negative electrode comprising a material containing graphite as a negative electrode active material, characterized in that the non-aqueous electrolytic solution contains a non-aqueous solvent mainly composed of a cyclic carbonate and a chain carbonate in which a lithium salt is dissolved as a solute, and further contains not less than 1.0% by weight and not more than 5.0% by weight of cyclohexylbenzene and not less than 0.01% by weight and less than 1.0% by weight of biphenyl based on the total amount of the non-aqueous electrolytic solution.

2. An electrolytic solution for non-aqueous type batteries according to claim 1, which further comprises not less than 0.01% by weight and less than 1.0% by weight of o-terphenyl.

3. An electrolytic solution for non-aqueous type batteries according to claim 1, which further comprises o-terphenyl and triphenylene, and the total amount of o-terphenyl, triphenylene, cyclohexylbenzene and biphenyl is 0.4-5% by weight based on the total amount of the non-aqueous electrolytic solution.

4. An electrolytic solution for non-aqueous type batteries according to claim 1, wherein the cyclic carbonate is at least one compound selected from ethylene carbonate (EC), propylene carbonate (PC), butylene carbonate (BC) and vinylene carbonate (VC).

5. An electrolytic solution for non-aqueous type batteries according to claim 1, wherein the chain carbonate is at least one compound selected from dimethyl carbonate (DMC), diethyl carbonate (DEC), ethylmethyl carbonate (EMC), methylpropyl carbonate (MPC) and ethylpropyl carbonate (EPC).

6. A non-aqueous type secondary battery having a positive electrode comprising a material containing a lithium-containing metal oxide as a positive electrode active material, a negative electrode comprising a material containing graphite as a negative electrode active material and a non-aqueous electrolytic solution, characterized in that the non-aqueous electrolytic solution contains a non-aqueous solvent mainly composed of a cyclic carbonate and a chain carbonate in which a lithium salt is dissolved as a solute, and further contains not less than 1.0% by weight and not more than 5.0% by weight of cyclohexylbenzene and not less than 0.01% by weight and less than 1.0% by weight of biphenyl based on the total amount of the non-aqueous electrolytic solution.

7. A non-aqueous type secondary battery according to claim 6, which further comprises not less than 0.01% by weight and less than 1.0% by weight of o-terphenyl.

8. A non-aqueous type secondary battery according to claim 6, which further comprises o-terphenyl and triphenylene, and the total amount of o-terphenyl, triphenylene, cyclohexylbenzene and biphenyl is 0.4-5% by weight based on the total amount of the non-aqueous electrolytic solution.

9. A non-aqueous type secondary battery according to claim 6, wherein the cyclic carbonate is at least one compound selected from ethylene carbonate (EC), propylene carbonate (PC), butylene carbonate (BC) and vinylene carbonate (VC).

10. A non-aqueous type secondary battery according to claim 6, wherein the chain carbonate is at least one compound selected from dimethyl carbonate (DMC), diethyl carbonate (DEC), ethylmethyl carbonate (EMC), methylpropyl carbonate (MPC) and ethylpropyl carbonate (EPC).

11. A battery comprising an electrolytic solution in which an electrolyte is dissolved in a non-aqueous solvent, the electrolytic solution comprising two or more organic compounds added thereto, said two or more organic compounds differing in oxidative polymerization potential, with a proviso that the ratio of the percent by weight of the organic compound of relatively higher oxidative polymerization reaction potential and the organic compound of relatively lower oxidative polymerization reaction potential is not lower than 10:1 and not higher than 4:1, wherein the organic compound of relatively higher oxidative polymerization reaction potential is cyclohexylbenzene and the organic compound of relatively lower oxidative polymerization reaction potential is biphenyl, wherein the battery is a secondary battery.

* * * * *

UNITED STATES PATENT AND TRADEMARK OFFICE
CERTIFICATE OF CORRECTION

PATENT NO. : 7,824,809 B2  
APPLICATION NO. : 12/630685  
DATED : November 2, 2010  
INVENTOR(S) : Shoichiro Watanabe et al.

Page 1 of 1

It is certified that error appears in the above-identified patent and that said Letters Patent is hereby corrected as shown below:

On the Title Page  
Item (62), lines 1-2, incorrectly reads:  
"(62) Division of application No. 10/333,617, filed on Jan. 22, 2003, now abandoned"  
and should read:  
"(62) Division of application No. 10/333,617, filed on Jan. 22, 2003, now abandoned, which is a 371 of PCT/JP2001/007434 08/29/2001"

Item (30) Foreign Application Priority Data, was omitted, it should read:  
"October 12, 2000 (JP)................ 2000-311626"

Signed and Sealed this  
Fourteenth Day of February, 2012

David J. Kappos  
*Director of the United States Patent and Trademark Office*